(12) United States Patent
Payrat et al.

(10) Patent No.: US 8,183,886 B2
(45) Date of Patent: May 22, 2012

(54) APPARATUS FOR DETECTING A USB HOST

(75) Inventors: Eric Payrat, Simiane-Collongue (FR); Majid Kaabouch, Rousset (FR)

(73) Assignee: Atmel Rousset S.A.S., Rousset (FR)

( * ) Notice: Subject to any disclaimer, the term of this patent is extended or adjusted under 35 U.S.C. 154(b) by 0 days.

(21) Appl. No.: 13/023,285

(22) Filed: Feb. 8, 2011

(65) Prior Publication Data
US 2011/0131345 A1 Jun. 2, 2011

Related U.S. Application Data

(63) Continuation of application No. 12/051,935, filed on Mar. 20, 2008.

(51) Int. Cl.
*H03K 19/094* (2006.01)
(52) U.S. Cl. ............ 326/86; 326/87; 326/21; 710/16; 710/18
(58) Field of Classification Search .......... 326/62, 326/68, 86, 87; 710/15–19
See application file for complete search history.

(56) References Cited

U.S. PATENT DOCUMENTS

| | | | |
|---|---|---|---|
| 2003/0206547 A1* | 11/2003 | Cho | 370/364 |
| 2006/0000917 A1 | 1/2006 | Kim et al. | |
| 2006/0075152 A1 | 4/2006 | Zhu | |
| 2007/0030035 A1 | 2/2007 | Komatsu et al. | |
| 2008/0195770 A1* | 8/2008 | Wang et al. | 710/18 |
| 2009/0240843 A1 | 9/2009 | Payrat et al. | |

OTHER PUBLICATIONS

"U.S. Appl. No. 12/051,935, Non-Final Office Action mailed Aug. 2, 2010", 6 pgs.
"U.S. Appl. No. 12/051,935, Notice of Allowance mailed Dec. 15, 2010", 7 pgs.
"U.S. Appl. No. 12/051,935, Response filed Oct. 19, 2010 to Non Final Office Action mailed Aug. 2, 2010", 6 pgs.

* cited by examiner

*Primary Examiner* — Shawki S Ismail
*Assistant Examiner* — Jany Tran
(74) *Attorney, Agent, or Firm* — Fish & Richardson P.C.

(57) ABSTRACT

A multi-interface integrated circuit (IC) comprises a plurality of transistors, and a level detection block. At least one transistor of the plurality of transistors is in communication with a first terminal and either a first or a second lead of the multi-interface IC, and at least one of the plurality of transistors is in communication with the first terminal, a second terminal and either the first or a second lead of the multi-interface IC. The level detection block is in communication with at least one of the plurality of transistors and the first and second leads.

19 Claims, 2 Drawing Sheets ized to perform various method functionalities and/or operations to be performed. Also, as one skilled in the art will appreciate, the term "step," as used herein, is intended to be synonymous with the term "operation," and further is not necessarily intended to convey or denote the performance of the method in any certain order.

APPARATUS FOR DETECTING A USB HOST

RELATED APPLICATIONS

This application is a continuation of U.S. patent application Ser. No. 12/051,935, filed on Mar. 20, 2008. which is incorporated herein by reference in its entirety,

FIELD OF INVENTION

The present invention is related to detection of a universal serial bus USB host.

BACKGROUND

In multi-interface integrated circuit (IC) devices, such as smart card devices that include an ISO-7816 operating mode and a USB operating mode, it is necessary to detect which type of interface is connected to the device. In the case, for example, where the USB interlace is not used and the USB host is not connected, the USB pads, (designated D+ and D−), which are associated with the USB host being connected, are left floating on the USB interface side. This floating state of the D+ and D− pads tends to result in an increased power consumption in the IC device and may even render it non-functional. Additionally, software that is embedded in the IC device requires knowledge of the presence of the USB host to activate or deactivate the USB software associated with the IC device, which may cause an additional power drain.

Currently, to perform detection of a USB host, an IC device includes pull-up resistors connected between a power supply and the D+ and D− leads through switches. The USB host, on the other hand, includes pull-down resistors that connect the D+ and D− leads to ground terminals. The pull-down resistors are significantly less resistive than the pull-up resistors. Therefore, if the USB host is present, then D+ and D− are tied to ground through the pull-down resistors, whereas if the USB host is not present, D+ and D− are tied to the power supply via the pull-up resistors. The use of resistors, however, requires a significant amount of physical space to accommodate them, as well as a significant amount of power to drive current through them.

SUMMARY

An apparatus embodiment for detecting the presence of a universal serial bus (USB) host connection to a multi-interface integrated circuit (IC) is disclosed. The apparatus embodiment includes a multi-interface integrated circuit (IC) comprising a plurality of transistors and a level detection block. At least one transistor of the plurality of transistors is in communication with a first terminal and either a first or a second lead of the multi-interface IC, and at least one of the plurality of transistors is in communication with the first terminal, a second terminal and either the first or a second lead of the multi-interface IC. The level detection block is in communication with at least one of the plurality of transistors and the first and second leads.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF EXAMPLE EMBODIMENTS

Embodiments of the present invention will be described with reference to the figures wherein like numerals represent like elements throughout.

The Multi-Interface IC Device

Figure 1:
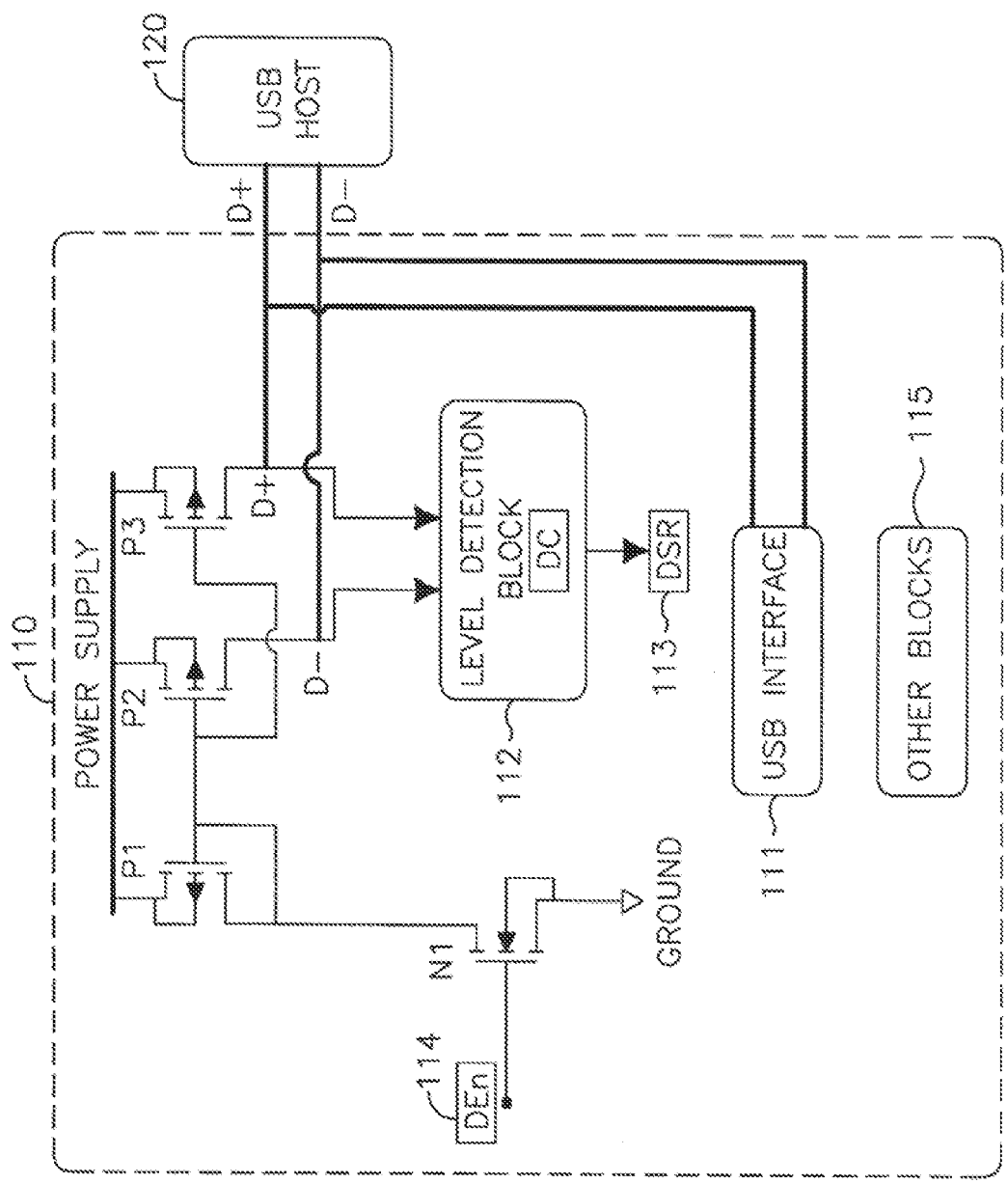
FIG. 1 is a block diagram of a multi-interface IC device in accordance with an embodiment of the invention.

In accordance with an embodiment of the invention, FIG. 1 is a block diagram of a multi-interface IC device 110, capable of connection with a USB host 120. The IC interface 110 includes a USB interface block 111, a level detection block 112, a detection status register (DSR) 113, a detection enable block (DEn) 114, a plurality of P metal oxide semiconductor (MOS) transistors (designated P1, P2, and P3), an NMOS transistor (designated N1), a first terminal, which for example, may be a power supply, and other functional blocks 115. Although three PMOS transistors and one NMOS transistor are shown in an example configuration, other numbers and configurations of transistors may be utilized. The multi-interface IC device 110 may also include a central processing unit (CPU) to control the circuitry depicted in the multi-interface IC device 110. The transistors N1, P1, P2, and P3 may be selected such that they have low power consumption requirements. The USB interface block 111 may represent an IP block that manages USB data transfer between the CPU and the HOST via the D+ and D− physical interface. The other functional blocks 115 may include peripherals to the CPU.

As shown in FIG. 1, DEn 114 is connected to the gate of N1, the source of N1 is connected to a second terminal, which for example, may be ground, and the drain of N1 is connected to the gates of P1, P2. and P3, as well as the drain of P1. The sources of P1, P2, and P3 are connected to the power supply. The drains of P2 and P3 are connected to D+ and D−, respectively, which, in turn are connected to the level detection block 112 and the USB interface block 111. The level detection block 112 includes an internal detection counter (DC) that may be incremented as the level detection block 112 is in the process of detecting for the presence of the USB host 120.

USB Host Detection Method

Figure 2:
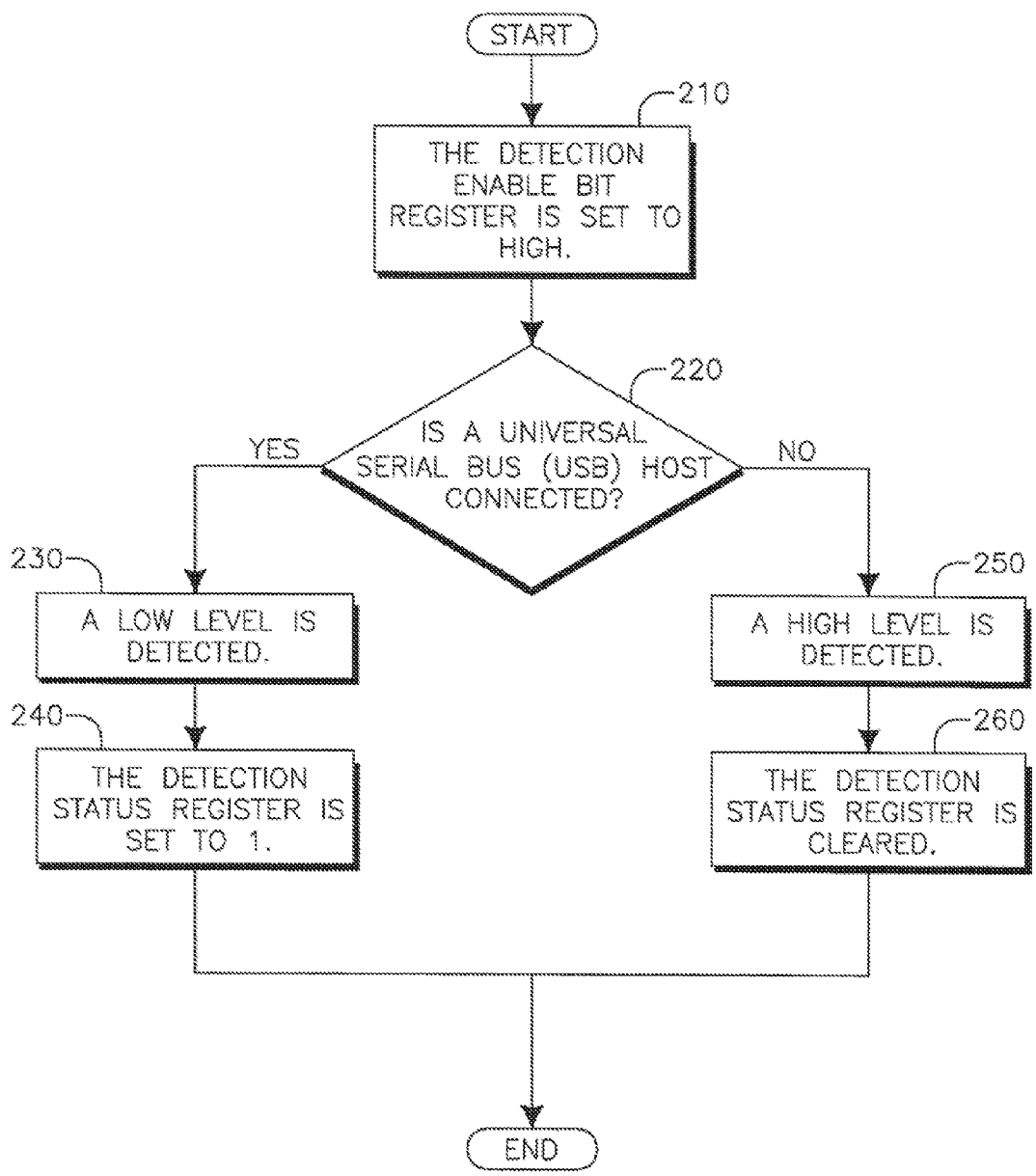
FIG. 2 is a flow diagram of a method embodiment of detecting a USB host, in accordance with an embodiment of the invention.

FIG. 2 is a flow diagram of a method embodiment 200 of detecting the USB host 120, in accordance with an embodiment of the present invention. In step 210, a bit in the DEn block 114 is set to high, or "1". This setting may be controlled by a CPU (not shown) or other mechanism. When the DEn bit is set to high, N1 is activated, or turned on. As a result of N1 being activated. P1, which controls the current sources to P2 and P3, is activated. By virtue of P1 being activated, P2 and P3 are activated, or turned on. This enables USB host detection. When the DEn bit is low, then P1, P2, and P3 remain deactivated. In this case, USB host detection is disabled.

If USB host detection is enabled, and therefore transistors P2 and P3 are turned on, then it is determined whether or not the USB host 320 is connected (step 220). This determination may occur by the level detection block 112 sampling D+ and D− on each positive or negative edge of the CPU clock during a number "N" of CPU cycles. In one example, N=64. If the USB host 120 is present, then a first level at D+ and D−, which may be a low level, will be detected (step 230) due to D+ and D− being connected to ground via the pull-down resistors in the USB host 120 (not shown). In this case, the DSR 113 is set to a first value, such as "1" (step 240), indicating the presence of the USB host 120.

If the USB host 120 is not present, then a second level at D+ and D−, which may be a high level, will be detected (step 250) due to D+ and D− having the voltage level of the power supply through P3 and P2, respectively, since transistors P3 and P2 are activated when USB host detection is enabled. The DSR 113 is then set to a second value, which may include clearing the DSR (step 260). Similarly, if only one of D+ or D− is detected at the first level described above, and the other of D+ or D− is detected at the second level, then the DSR 113 is set to the second value.

Other alternative method embodiments, and variations of the method embodiment 200, may include the utilization of software to enable detection after the power on sequence of the multi-interface IC 110. In this case, if the USB host 120 is present, the status register DSR 113 will be set to one and the CPU may receive a CPU interrupt to process the request to begin the USB data transfer with the USB host 120. This may improve CPU processing efficiency and bandwidth.

Additionally, the DEn block 114 could be suppressed, and the gate of N1 connected directly to a supply voltage. In this scenario, transistors P1, P2, and P3 will be turned on at all times and, therefore, the level detection block 112 will be performing detection for the USB host 120. An advantage to this approach is that software configured to turn on and off the DEn block 114 would not be required.

Although the features and elements of the present invention are described in the example embodiments in particular combinations, each feature or element can be used alone without the other features and elements of the example embodiments or in various combinations with or without other features and elements of the present invention. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit.

What is claimed is:

1. A device comprising:
    multiple interfaces including a physical interface having a D+ lead and D− lead;
    a first transistor directly coupled between a power supply and the D+ lead;
    a second transistor directly coupled between the power supply and the D− lead;
    a detection status register; and
    a level detector coupled to the D+ and D− leads and configured to detect whether a low signal level or a high signal level is present on the D+ and D− leads,
    wherein the level detector is further configured to (i) determine a connection status of a universal serial bus (USB) host to the physical interface based upon the detection of the low signal level or the high signal level, and (ii) set a value of the detection status register based upon the determination of the connection status of the USB host to the physical interface,
    wherein the level detector further includes a detection counter that is configured to count a number of times the level detector detects whether the low signal level or the high signal level is present on the D+ and D− leads.

2. The device of claim 1, further comprising a detection enable block configured to control operation of the first and second transistors and enable detection by the level detector.

3. The device of claim 2, wherein when the detection enable block is set to a first state, the first and second transistors are switched on and the level detector begins determining whether or not a USB host is connected to the D+ and D− leads.

4. The device of claim 2, further comprising a central processing unit (CPU) configured to set a state of the detection enable block.

5. The device of claim 2, further comprising a third transistor that is coupled between gate terminals of the first and second transistors and the detection enable block, wherein the third transistor is configured to enable the first and second transistors based on a state of the detection enable block.

6. The device of claim 5, further comprising a fourth transistor coupled between the detection enable block and the third transistor, wherein the fourth transistor is configured to enable the third transistor based on a state of the detection enable block.

7. The device of claim 1, wherein the level detector is configured to sample a signal level of the D+ and D− leads.

8. The device of claim 7, wherein the level detector is configured to set the detection status register to a first value if a low signal level is detected during sampling, and to a second value if a high signal level is detected.

9. The device of claim 8, wherein a low signal level indicates a presence of a USB host connection and a high signal level indicates an absence of the USB host connection.

10. The device of claim 1, wherein the first and second transistor are operational at all times such that the level detector is configured to detect at all times a signal level present on the D+ and D− leads.

11. A device comprising:
    a physical multi-interface having a D+ lead and a D− lead;
    a detection status register;
    a level detector configured to detect whether a low signal level or a high signal level is present on the D+ and D− leads in the physical multi-interface, wherein the level detector is further configured to determine a connection status of a universal serial bus (USB) host to the physical multi-interface based upon the detection of the low signal level or the high signal level, and set a value of the detection status register based upon the determination of the connection status of the USB host to the physical multi-interface; and
    a detection counter included in the level detector and configured to count a number of times the level detector detects whether the low signal level or the high signal level is present on the D+ and D− leads.

12. The device of claim 11, further comprising a plurality of transistors selectively directly coupled between a power supply and the D+ and D− leads to enable detection by the level detector.

13. The device of claim 12, further comprising a detection enable block, wherein when the detection enable block is set to a first state, the plurality transistors are switched on and the level detector begins determining whether a USB host is connected to the D+ and D− leads.

14. The device of claim 13, further comprising a central processing unit (CPU) configured to set a state of the detection enable block.

15. The device of claim 12, wherein the level detector is configured to sample a signal level of the D+ and D− leads.

16. The device of claim 15, wherein the level detector is configured to set the detection status register to a first value if a low signal level is detected during sampling, and to a second value if a high signal level is detected.

17. The device of claim 16, wherein a low signal level indicates a presence of a USB host connection and a high signal level indicates an absence of the USB host connection.

18. A device comprising:
   a physical multi- interface having a first lead and a second lead;
   a detection status register;
   a level detector configured to detect whether or not a low signal level or a high signal level is present on first and second leads in the physical multi-interface, wherein the level detector is further configured to determine a connection status of a host to the physical multi-interface based upon the detection of the low signal level or high signal level, and set a value of the detection status register based upon the determination of the connection status of the host to the physical multi-interface,
   wherein the level detector further includes a detection counter that is configured to count a number of times the level detector detects whether the low signal level or the high signal level is present on the first and second leads; and
   a plurality of transistors selectively directly coupled between a power supply and the first and second leads to enable detection by the level detector.

19. The device of claim 18, further including a detection enable block, wherein when the detection enable block is set to a first state, the plurality of transistors are switched on and the level detector begins determining whether the host is connected to the first and second leads.

* * * * *

UNITED STATES PATENT AND TRADEMARK OFFICE
CERTIFICATE OF CORRECTION

PATENT NO. : 8,183,886 B2  
APPLICATION NO. : 13/023285  
DATED : May 22, 2012  
INVENTOR(S) : Eric Payrat Page 1 of 1

It is certified that error appears in the above-identified patent and that said Letters Patent is hereby corrected as shown below:

Column 1, line 6, please delete "2008." and insert therefor --2008,--;

Column 1, line 7, please delete "entirely," and insert therefor --entirety.--;

Column 1, line 20, please delete "interlace" and insert therefor --interface--;

Column 2, line 36, please delete "P2." and insert therefor --P2,--;

Column 2, line 38, please delete "D+ and D-" and insert therefor --D- and D+--;

Column 2, line 51, please delete "activated." and insert therefor --activated,--;

Column 2, line 58, please delete "320" and insert therefor --120--;

Column 4, line 41, Claim 10, please delete "transistor" and insert therefor --transistors--;

Column 4, line 67, Claim 13, after "plurality" please insert --of--; and

Column 5, line 15, Claim 18, please delete "multi- interface" and insert therefor --multi-interface--.

Signed and Sealed this  
Fourteenth Day of August, 2012

David J. Kappos  
*Director of the United States Patent and Trademark Office*